United States Patent

Arai et al.

[11] Patent Number: 6,020,094
[45] Date of Patent: Feb. 1, 2000

[54] METHOD AND DEVICE FOR FORMING A DUPLICATE IMAGE

[75] Inventors: Hitoshi Arai; Tohru Hibara; Ryuuichi Tsukamoto; Kouichiro Iida, all of Tokyo-to, Japan

[73] Assignee: Riso Kagaku Corporation, Tokyo, Japan

[21] Appl. No.: 08/804,849

[22] Filed: Feb. 24, 1997

Related U.S. Application Data

[63] Continuation of application No. 08/300,515, Sep. 6, 1994, abandoned.

[30] Foreign Application Priority Data

Sep. 6, 1993 [JP] Japan .................................. 5-221427

[51] Int. Cl.$^7$ ....................................................... B41C 1/00
[52] U.S. Cl. ............................... 430/21; 430/44; 430/54; 101/114; 101/115; 101/121; 399/183
[58] Field of Search ................................. 430/21, 44, 54; 101/115, 114, 121; 399/183

[56] References Cited

U.S. PATENT DOCUMENTS

| | | | |
|---|---|---|---|
| 4,476,497 | 10/1984 | Oshikoshi et al. | 358/298 |
| 4,896,208 | 1/1990 | Moriya et al. | 358/540 |
| 4,998,132 | 3/1991 | Kurogane et al. | 355/40 |
| 5,048,114 | 9/1991 | Moriya | 382/298 |
| 5,201,027 | 4/1993 | Casini | 395/107 |
| 5,206,687 | 4/1993 | Suzuki et al. | 355/214 |
| 5,331,376 | 7/1994 | Acquaviva | 355/202 |
| 5,671,429 | 9/1997 | Tanaka | 399/183 |

FOREIGN PATENT DOCUMENTS

| | | |
|---|---|---|
| 467663 | 1/1992 | European Pat. Off. |
| 2250481 | 6/1992 | United Kingdom ................... 101/114 |

OTHER PUBLICATIONS

"Patent Abstracts of Japan," vol. 14, No. 392 (P–1096), Aug. 1990; Abstract of JP 2–148037, Katsuhiro et al. (Jun. 1990).

*Primary Examiner*—John A. McPherson
*Attorney, Agent, or Firm*—Dickstein Shapiro Morin & Oshinsky LLP

[57] ABSTRACT

In a method for forming a duplicate image by reading an original image from an original sheet and forming a duplicate image according to the original image, to allow the designation of a number of regions for forming duplicate regional images, from an overall image, with desired color separation or other various attributes to be carried out accurately, promptly and simply by mounting the original sheet only once on a digitizer or the like without regard to the number of processes of forming a duplicate image, a plurality of regions designated on a single original sheet are stored in a storage device such as computer memory, either the designated region stored in the storage device or the region other than the designated region is defined as an effective region, a duplicate image of only the effective region is formed for a first process of forming a duplicate image, only the region other than the effective region for the first process of forming a duplicate image is defined as a new effective region, and a duplicate image only for this new effective region is formed for the second process of forming a duplicate image.

11 Claims, 8 Drawing Sheets

METHOD AND DEVICE FOR FORMING A DUPLICATE IMAGE

This application is a continuation of application Ser. No. 8/300,515 filed Sep. 6, 1994, now abandoned.

TECHNICAL FIELD

The present invention relates to a method and a device for forming a duplicate image, and in particular to a method and a device for forming a duplicate image suitable for use in stencil plate making/printing device which is capable of multi-color printing among other possibilities.

BACKGROUND OF THE INVENTION

In a duplicate image forming device for reading an original image from an original sheet, and forming a duplicate image according to the original image, such as an electrographic copying device and a thermal stencil master plate making/printing device, conventionally, a plurality of duplicate images or duplicate stencil master plates are formed or prepared from a single original sheet for two-color or multi-color copying and stencil printing.

For instance, when only a part of the original image on an original sheet is to be stencil printed in a different color, two stencil master plates are prepared, one of them including only a designated region of the original image that is to be printed in one color while the other stencil master plate covers the remaining part of the original image that is to be printed in another color, and the two stencil master plates are used one after the other using inks of two different colors on a same sheet of printing paper.

In the case of preparing a duplicate stencil master plate, a duplicate stencil master plate may be prepared for each of a plurality of original sheets each covering a different region of an original image, but it means a substantial complication in the preparation of the original sheets because the same number of original sheets as the number of necessary colors are required.

It is known to designate a region of an original image that is to be extracted from the original image or an ineffective region of the original image that is to be discarded by using a coordinate input device such as a digitizer, and to carry out the process of preparing a stencil master plate only with respect to the effective region which may be either the designated region or the area other than the designated region. In this case, all that is needed is a single original sheet which includes all of the original image to be printed, and there is no need to prepare a same number of original sheets as the number of colors.

However, even when a digitizer is used, a region of the original image that is to be extracted or a region of the original image that is to be made ineffective must be designated with the coordinate input means each time a stencil master plate is to be prepared, and this requires not only a substantial amount of work but also introduces the possibility of erroneously designating an area.

In particular, when different regions of an original image are designated from an original sheet and are individually read, because the designation of a region with a digitizer and the reading of the original image are carried out in alternating turns, it is necessary to mount the original sheet on the digitizer every time a stencil master plate is to be prepared.

This is not only inconvenient for the operator but also may cause some relative errors to be produced for each stencil master plate because the original sheet may not be properly registered every time it is mounted on the digitizer for designating a region. Thus, the process of plate making and test printing must be repeated a number of times before a satisfactory result can be obtained.

This problem arises not only in the process of preparing duplicate stencil master plates but also in the process of forming duplicate images such as image copying.

BRIEF SUMMARY OF THE INVENTION

In view of such problems of the prior art, a primary object of the present invention is to provide a method and a device for forming a duplicate image which can accurately designate a plurality of regions from an original image on an original sheet in the process of forming a duplicated image simply by mounting the original sheet on a digitizer or the like only once without regard to the number of processes of forming a duplicate image.

A second object of the present invention is to provide a method and a device for forming a duplicate image which can process the original image, for instance by separating the original image into different colors in a simple and efficient manner.

According to the present invention, such an object can be accomplished by providing a method for forming a duplicate image from a single original image, comprising the steps of: designating a plurality of regions from a single original sheet by using an electronic region designating means; storing the designated regions in designated region storage means; assigning a different attribute to each of the designated regions; reading an overall original image from the single original sheet; and forming a regional image located inside each of the regions on image carrying means, and (2) a device for forming a duplicate image from a single original image, comprising: coordinate input means for designating a plurality of regions from a single original sheet;

designated region storage means for storing information on the designated regions; attribute assigning means for assigning a different attribute to each of the designated regions; image reading means for reading an overall original image from the original sheet; and regional image forming means for forming a regional image located inside each of the regions on common image carrying means.

When a plurality of master plates each having a different attribute is intended to be prepared from a single original image, the method of the present invention may comprise the steps of designating a plurality of regions from a single original sheet by using electronic region designating means; storing the designated regions in designated region storage means; assigning a different attribute to each of the designated regions; reading an overall original image from the single original sheet; and forming a regional image located inside each of the regions on a stencil master plate sheet.

As can be readily understood, it is not necessary to positively designate all of the regions. In general, when designating N number of different regions are designated to cover an overall image, only (N−1) regions are needed to be designated because the remaining N-th region can be designated by failing to be positively designated. For instance, one region may be extracted for one attribute, and the remaining region may be left as it is or may be assigned with another attribute.

According to a certain aspect of the present invention, a region designated on a single original sheet is stored in storage means, and, either the designated region stored in the storage means or the region other than the designated region being defined as an effective region, a duplicate image of only the effective region is formed for a first process of forming a duplicate image. Then, for the second process of forming a duplicate image, only the region other than the effective region for the first process of forming a duplicate image is defined as a new effective region, and a duplicate image only for this new effective region is formed.

Alternatively, a plurality of regions designated on an original sheet are stored in storage means for individual processes of forming a duplicate image, in a mutually distinguishable manner, and only one of the designated regions is defined as an effective region for each associated one of the processes of forming a duplicate image (preparing a duplicate master plate) whereby a duplicate image is formed from a single common original sheet with regard to the individually designated region for each associated one of the processes of forming a duplicate image (preparing a duplicate master plate).

In either case, designation of a plurality of regions is completed before forming the regional images, and there is no need to remount the original sheet after each step of designating a region. Therefore, mis-registration of the regional images can be avoided without any effort. Also, because the process of designating the regions can be carried out without any interruption, conflicts and other errors can be easily avoided. Typically, designation of the regions are electronically processed, and it is possible to check for any conflicts by suitable software.

Preferably, the overall original image is stored in image storing means so that the overall process can be most efficiently carried out. If desired, it is possible to display final and/or intermediate results on a display unit to eliminate any possibility of oversight by the operator or production of unacceptable prints.

Forming of an image can be accomplished in a number of ways. For instance, the image carrying means may consist of plain paper, and the regional image forming step may comprise the steps of electrographically forming latent images of the regional images individually on a photosensitive drum, and depositing toner according to the latent images formed on the photosensitive drum on a single sheet of plain paper. Alternatively, the image carrying means may consist of printing paper, and the regional image forming step may comprise the steps of forming regional images by perforation individually on a stencil master plate sheet, and stencil printing said regional images on a single sheet of printing paper.

Obviously, there are a number of equivalents to the plain paper and the printing paper, and such equivalents may include transparencies, and other special copying papers. The present invention can be also applied to other modes of printing such as ink jet printing, thermal transfer printing, and laser printing as means for forming a duplicate image.

The attributes that can be assigned to different regions include different colors, different background patterns such as halftone and other patterns, and different images electronically stored in graphic and/or text storage means.

BRIEF DESCRIPTION OF THE DRAWINGS

Now the present invention is described in the following with reference to the appended drawings, in which.

and

Figure 10:
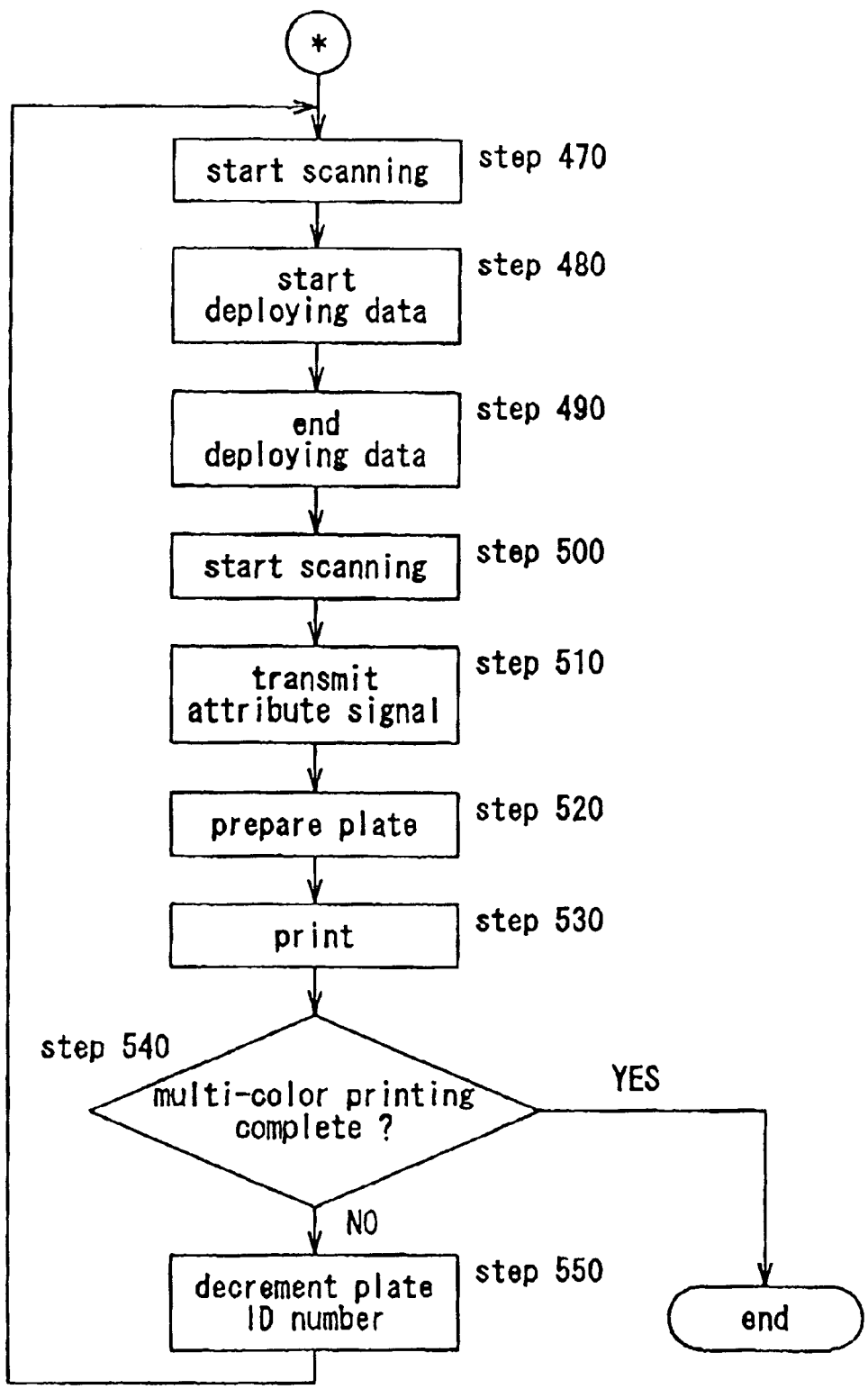

FIG. 10 is a flow chart showing the second half of the operation of the stencil printing device equipped with the duplicate master plate making device according to the present invention.

DETAILED DESCRIPTION OF THE PREFERRED EMBODIMENTS

Figure 1:
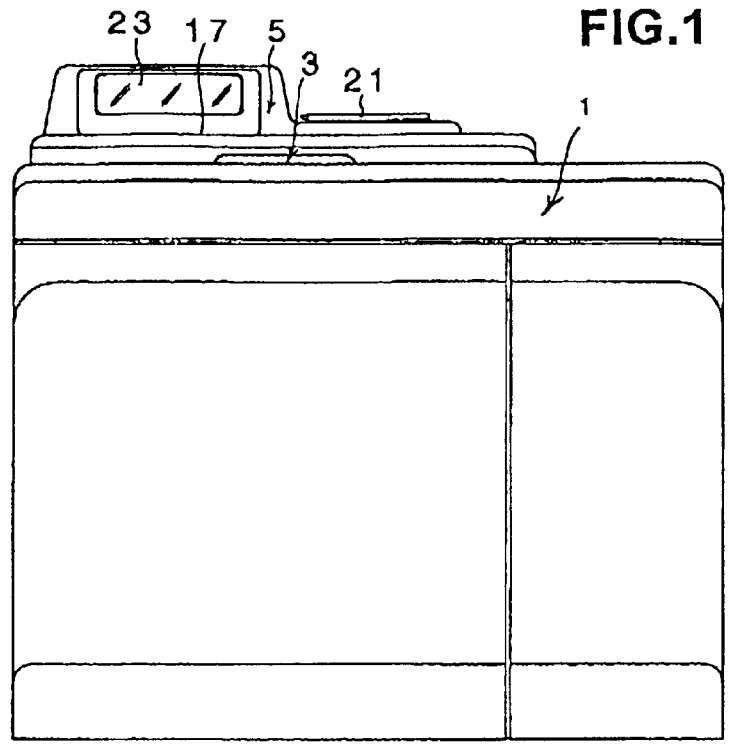
FIG. 1 is a front view showing the external appearance of a stencil printing device incorporated with the device for forming a duplicate image according to the present invention constructed as a duplicate master plate making/printing device.
Figure 2:
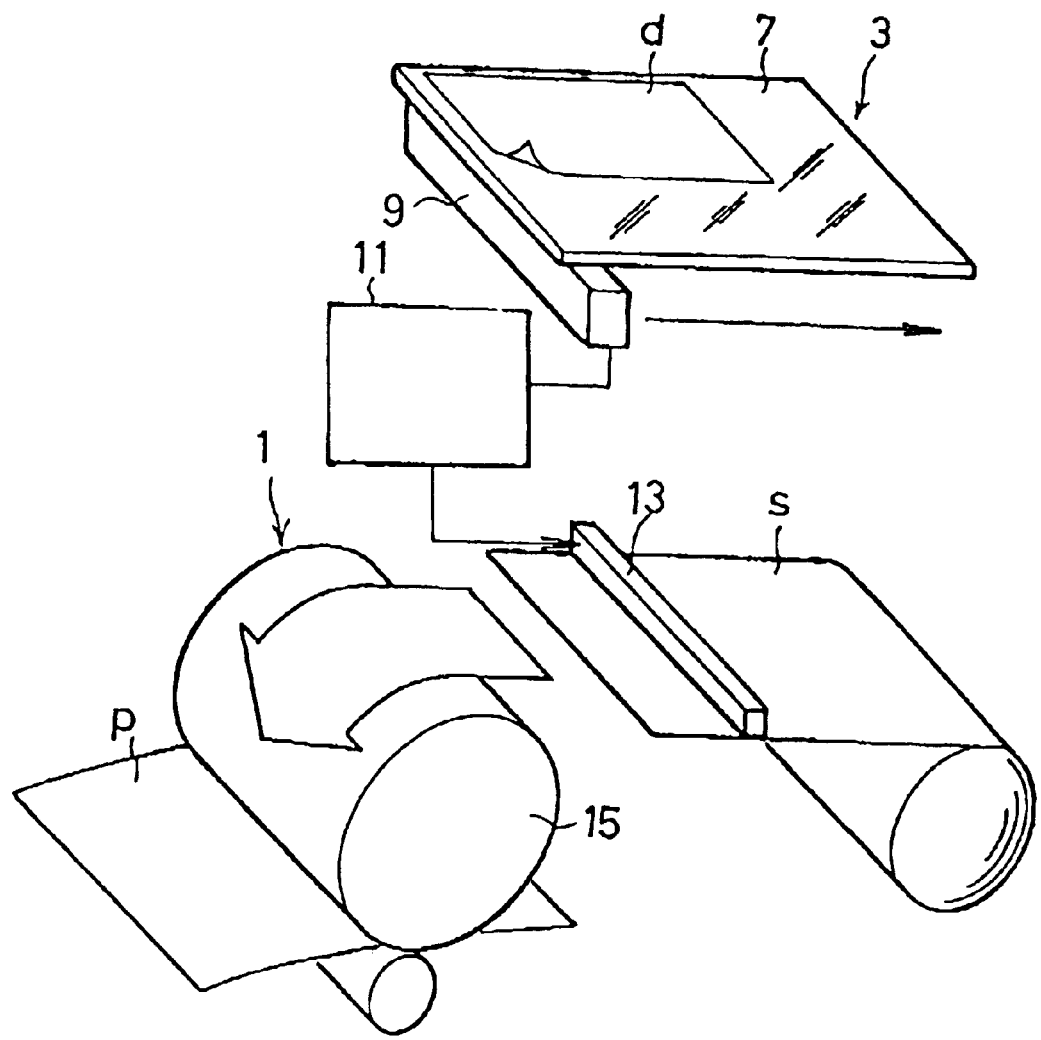
FIG. 2 is a perspective view showing the essential part of the device for making a duplicate stencil master plate and carrying out a stencil printing.

FIG. 1 shows a stencil printing device equipped with a duplicate stencil master plate making device. The duplicate stencil plate making device is capable of forming a duplicate image according to the present invention. This stencil printing device equipped with a master plate making device comprises a stencil printing device main body 1, an original reading unit 3 provided in an upper portion of the stencil printing device main body 1, and a digitizer 5 provided on an upper surface of a cover plate of the original reading unit 3 as a coordinate input means. This stencil printing device basically operates, as illustrated in FIG. 2, by photoelectrically scanning and reading an original image with an image sensor (image scanner) 9 from the light reflected from an original sheet d which is in turn positioned and mounted on an upper surface of a stage glass 7 of the original reading unit 3, digitizing the image data thus read with an image processing unit 11, making a duplicate master plate or forming a duplicated perforated image in a heat-sensitive stencil master plate sheet s consisting of a thermoplastic synthetic resin film and an ink-permeable porous support member, with a thermal head 13 provided in the stencil printing device main body 1, mounting the stencil master plate sheet s thus processed on a printing drum 15, and carrying out a rotary printing process on printing paper p fed to a prescribed position, by using the stencil master plate sheet s mounted on the printing drum 15.

The printing drum 15 is adapted to be interchangeable, and it is therefore possible to change the color of the printing ink or, in other words, the color of the printed image by changing the printing drum with a different one for printing of a different color.

Figure 3:
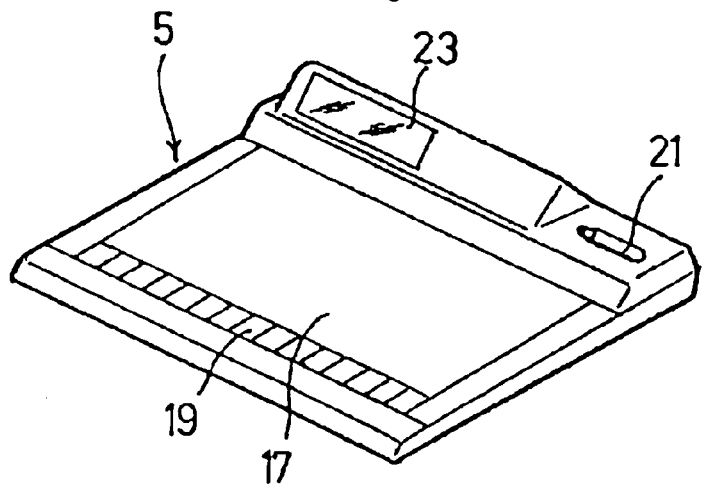
FIG. 3 is a perspective view of the digitizer used that can be used in the device for forming a duplicate image according to the present invention.

FIG. 3 shows the digitizer 5 which comprises an coordinate input surface unit 17 on which an original sheet d is to be positioned and mounted, an operation key unit 19, a stylus pen 21 for designating a coordinate, and a display unit 23 including an LCD unit.

Figure 4:
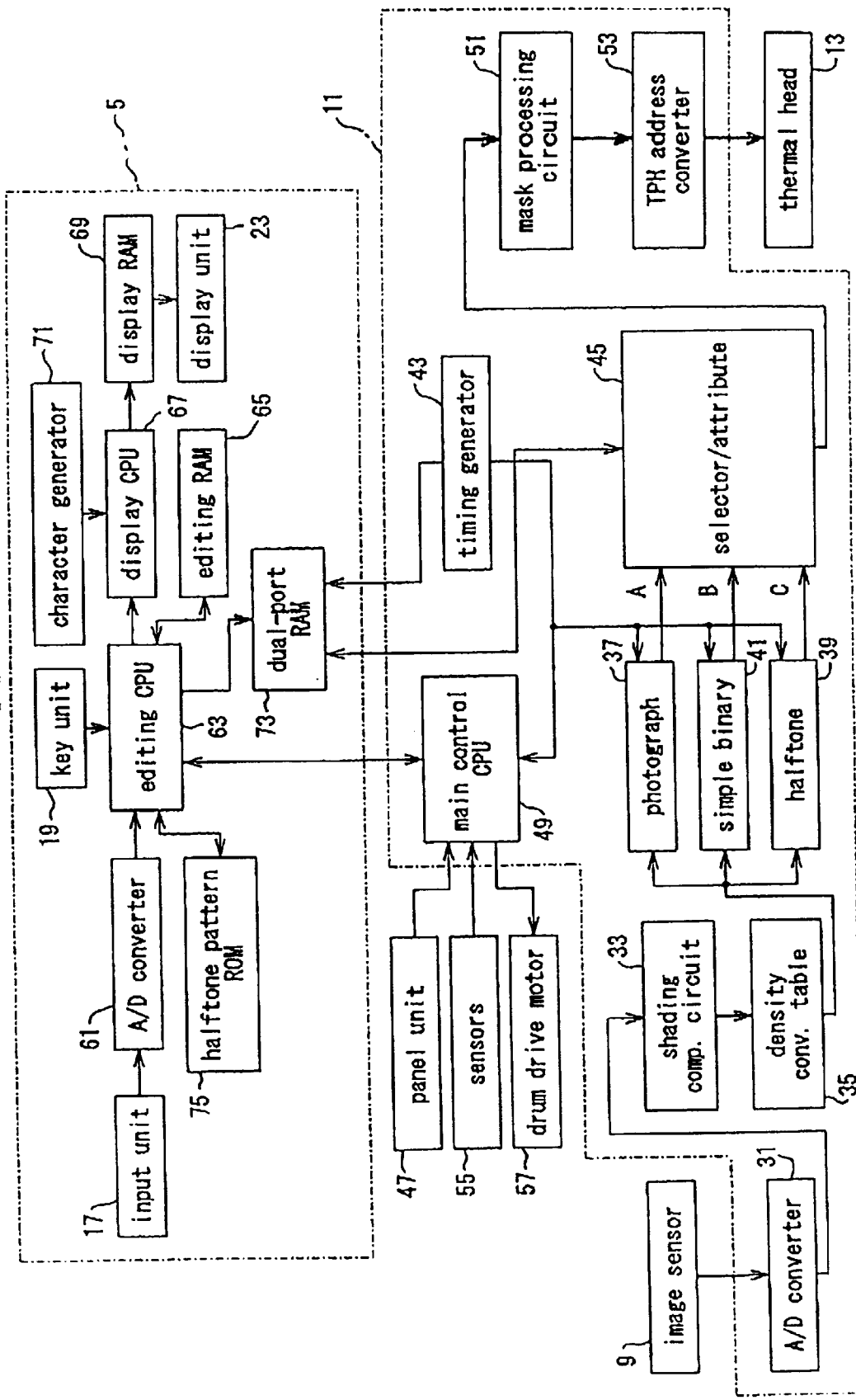
FIG. 4 is a block diagram showing an embodiment of the duplicate master plate making device according to the present invention.

The image processing unit 11 and the digitizer 5 are now described in greater detail with reference to the block diagram of FIG. 4. The original sheet d placed on the stage glass 7 (see FIG. 2) is photoelectrically read by an image sensor 9 consisting of a CCD or the like, and the image read-out signal from the image sensor 9 is converted into an 8-bit video signal, which is proportional to the magnitude of the reflected light, by an A/D converter 31 of the image processing unit 11. Thus, a video signal having 256 levels can be produced with "0" representing a brightest possible region and "255" representing a darkest possible region.

The shading compensation circuit 33 corrects any unevenness in the output of the image sensor 9 and the deterioration of the light source as well known in the art.

The video signal which has been corrected by the shading compensation circuit 33 is converted according to a density converting table at a gradation converting table unit 35 to match it with the output property of the stencil printing device. The thus converted video signal is supplied to a photograph processing circuit 37 serving as an intermediate density processing circuit, a halftone circuit 39, and a simple binary digitizing circuit 41.

The video signal representing a photographic output, such as halftone images and silver halide images, and character output is digitized in synchronism with a clock signal produced from a timing generator circuit 43, and supplied to a selector/attribute circuit 45.

The selector/attribute circuit 45 receives an attribute information signal stored in editing RAM 65 which is described hereinafter in synchronism with the scanning and reading of the original image by the image sensor 9, via dual-port RAM 73, receives image processing mode information specified by a panel unit 47 from the main control CPU 49, and selects a binary signal for forming a photographic, character or halftone image from the photographic processing circuit 37, the halftone circuit 39 and the simple digitizing circuit 41.

The attribute information signal is given as data of 8-bit data length, and there is a one-to-one correspondence between each bit and each item of attribute information. More specifically, data bit D0 corresponds to the function of erasure, D1 to black and white reversal, D2 to black, D3 to a photographic image and D4 to a character image.

Figure 5:
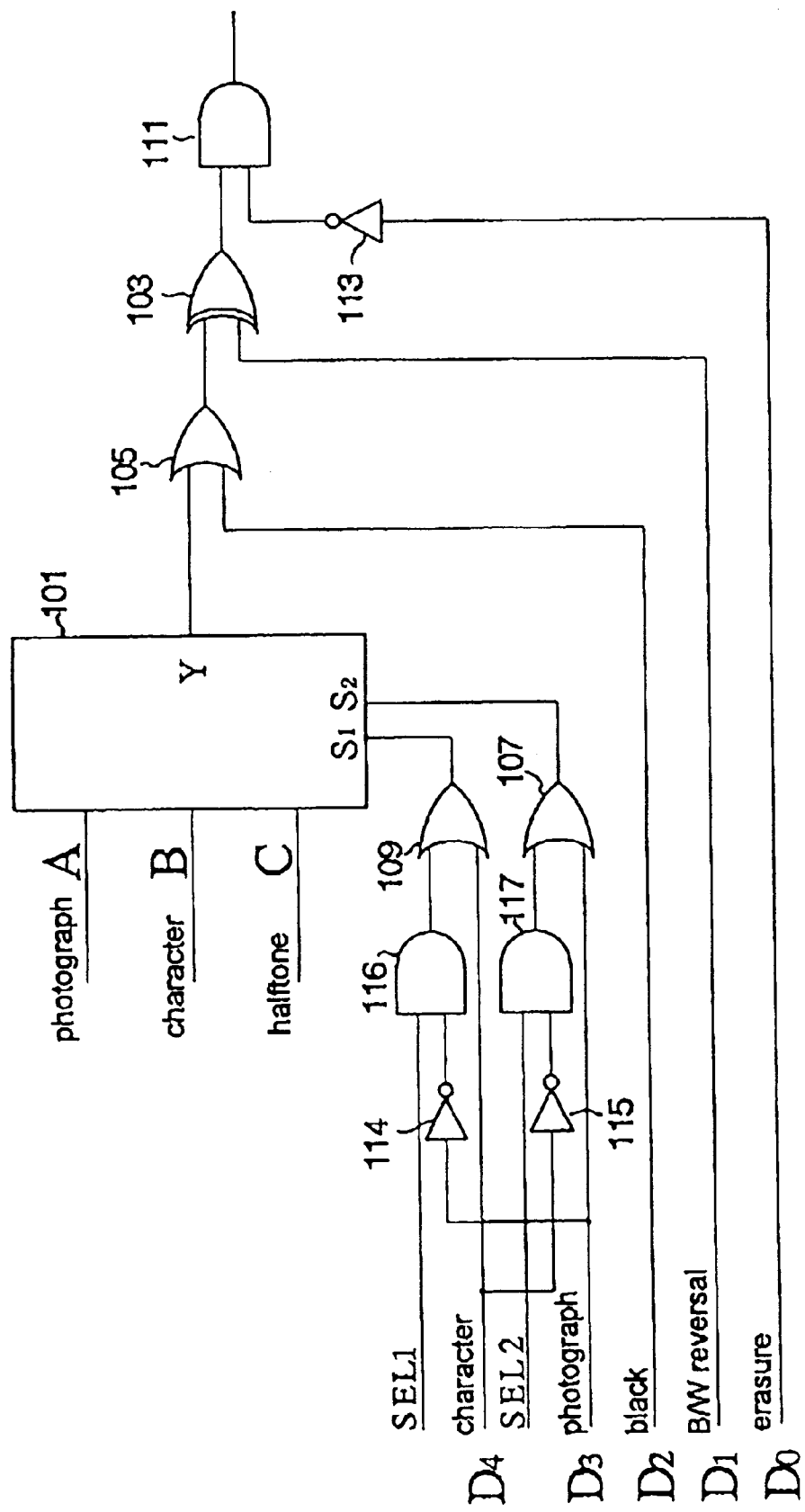
FIG. 5 is a circuit diagram showing a concrete structure of the selector/attribute circuit used in the duplicate master plate making device according to the present invention.

FIG. 5 shows a concrete example of the selector/attribute circuit 45 which comprises a multiplexer 101 for receiving binary signals A, B and C corresponding to photographic, character and halftone images from the photographic processing circuit 37, the halftone circuit 39 and the simple digitizing circuit 41, and EXOR gate 103 and OR gates 105, 107 and 109 for receiving the data bit signals for specifying black and white reversal D1, black D2, photographic image D3 and character image D4 out of the attribute information signals from the dual-port RAM 73, and supplies the selected binary signal for forming an image to an AND gate 111 for output.

The multiplexer 101 selects one of the signals A, B and C according to the signal supplied to its select terminals S1 and S2, and produces the selected signal from its output terminal Y. Signal B 10 is selected when the select terminal S1 receives "1" and the select terminal S2 receives "0", signal A is selected when the select terminal S1 receives "0" and the select terminal S2 receives "1", and signal C is selected when the select terminals S1 and S2 both receive "1".

Therefore, when the digitizer 5 is not used, because it is so designed that D3 and D4 both receive "0", the input of the AND gate 116 via an invertor 114 is "1", and the input of the AND gate 117 via an invertor 115 is "1". As a result, one of the photograph signal A, the character signal B and the halftone signal C is selected according to the logic combination of the select signals SEL1 and SEL2 from the main control CPU 49.

Suppose that a character image is selected by the panel unit 47, and the select signals SEL1 and SEL2 are "1" and "0" while D3 and D4 from the digitizer 5 are both "0". Then, the select terminals S1 and S2 are thus "1" and "0", and the character signal B is supplied to the output terminal Y as described previously.

When the designated region is desired to be produced as a photographic image, the region is designated with the digitizer 5, and a photographic image is selected as a desired attribute mode from the operation key unit 19. Then, the editing CPU 63 writes data "08"H into the editing RAM 65, and only the signal from D2 is "1". Therefore, once the desired region is reached, the D3 photographic signal becomes "1". Thus, because the input to the AND gate 116 via the invertor 114 is "0" and the output signal of the AND gate 116 via the invertor 114 is "0", the select terminal S1 produces "0". Meanwhile, because the D3 signal is "1", and the output signal of the OR gate is therefore "1", the select terminal S2 produces "1".

Because the select terminals S1 and S2 produce "0" and "1", respectively, a photographic signal A is produced at the output terminal Y.

Thus, without regard to the states of the signals SEL1 and SEL2 from the main control CPU 49, one of the image signals A, B and C is selected according to the combination of the signals D3 and D4 from the digitizer 5, overruling the control from the main body.

Now the black signal D2 is described. When the D2 signal is set to "1" according to the halftone pattern given by halftone pattern ROM 75, it becomes possible to add a black signal with the OR gate 105. In other words, it becomes possible to add a character or other background pattern onto an original image.

Now the black and white reversal signal D1 is described. By setting D1 to "1", the EXOR gate 103 produces "1" or a black signal when one of its inputs is "0" (white signal), and "0" or a white signal when one of its inputs is "1" (black signal). The EXOR gate 103 thus reverses the video signal from white to black or from black to white as the case may be.

Now the D0 signal (erasure) is described. When the corresponding signal is set to "1" by using the digitizer 5, because "0" is supplied to one of the inputs of the AND gate 111 via the invertor 113, irrespective of whether the video signal is "0" or "1", the output of the AND gate 111 is always "0" or a white signal. Thus, the D0 signal is used as a trimming signal for picking out only a designated region or a masking signal for erasing an unnecessary region.

The binary signal produced from the AND gate 111 is supplied to a mask processing circuit 51 which carries out a masking process for limiting the printed area according to the size of the printing paper.

The binary signal, after being subjected to the masking process, is converted into a perforation image signal by a TPH address converting circuit 53 to convert the signal into a suitable form for driving the thermal head 13, and is then forwarded to the thermal head 13.

The thermal head 13 then forms an image with perforation in a stencil master plate sheet s with a prescribed attribute assigned to an extracted region (the extracted region may consist of an entire region), and carries out a plate making process for the prescribed region in cooperation with the image processing unit 11.

The stencil master plate sheet s which is thermally perforated by the thermal head is automatically mounted on the printing drum by controlling the operation of a printing drum drive motor 57 while the main control CPU 49 monitors the output from various sensors 55.

The digitizer 5 comprises a coordinate input surface unit 17 which is adapted to be pressed point-wise by the stylus pen 21, and a voltage signal produced from the coordinate input surface unit 17 by the pressing of the stylus pen 21 is AD converted by an AD converter 61, and supplied to the editing CPU 63 before the coordinate data is stored in the editing RAM 65 serving as designated region coordinate data storage means.

The coordinate data stored in the editing RAM 65 is transferred to the display CPU 67 via a serial communication line, and the display CPU 67 sets up prescribed bits of the display RAM 69 according to the coordinate data.

Thus, an outline image showing the designated region is graphically displayed on the display unit 23 according to the coordinates designated by the coordinate input surface unit 17.

The display CPU 67 is connected to a character generator 71 for producing a prescribed message as required.

The editing CPU 63 supplies a signal to the dual-port RAM 73, the signal including the data bits which define the designated region or the region other than the designated region as an effective region according to the coordinate data stored in the editing RAM 65.

The editing CPU 63 assigns, individually, various editorial attributes such as extraction, erasure, character, photography, reversal and halftone to various designated regions designated by the stylus pen 21 at the coordinate input surface unit 17 by inputting attribute information from the operation key unit 19. The halftone pattern is given by the halftone pattern ROM 75.

The operation key unit 19 includes a two-color printing mode set-up key, and once the editing CPU 63 detects that a a two-color printing mode is set up by the two-color printing mode set-up key, the editing RAM 65 retains the coordinate data on the region designated by the stylus pen 21 on the coordinate input surface unit 17 until the second master plate for two-color printing is prepared or a cancel input is made.

In the two-color printing mode, the editing CPU 63 reads coordinate data from the editing RAM 65, and defines the designated region stored in the editing RAM 65 or the region other than the designated region as an effective region, and transfers a signal, using only the effective region as a region for forming an image, to the dual-port RAM 73 according to the selected attribute mode during the process of preparing a first master plate. During the process of preparing a second master plate, to define the area other than the effective region (region for forming an image) for the first master plate as a new effective region, the attribute information for the effective region for the first master plate is replaced by a masking signal (D0), and this signal is forwarded to the dual-port RAM 73.

Figure 6:
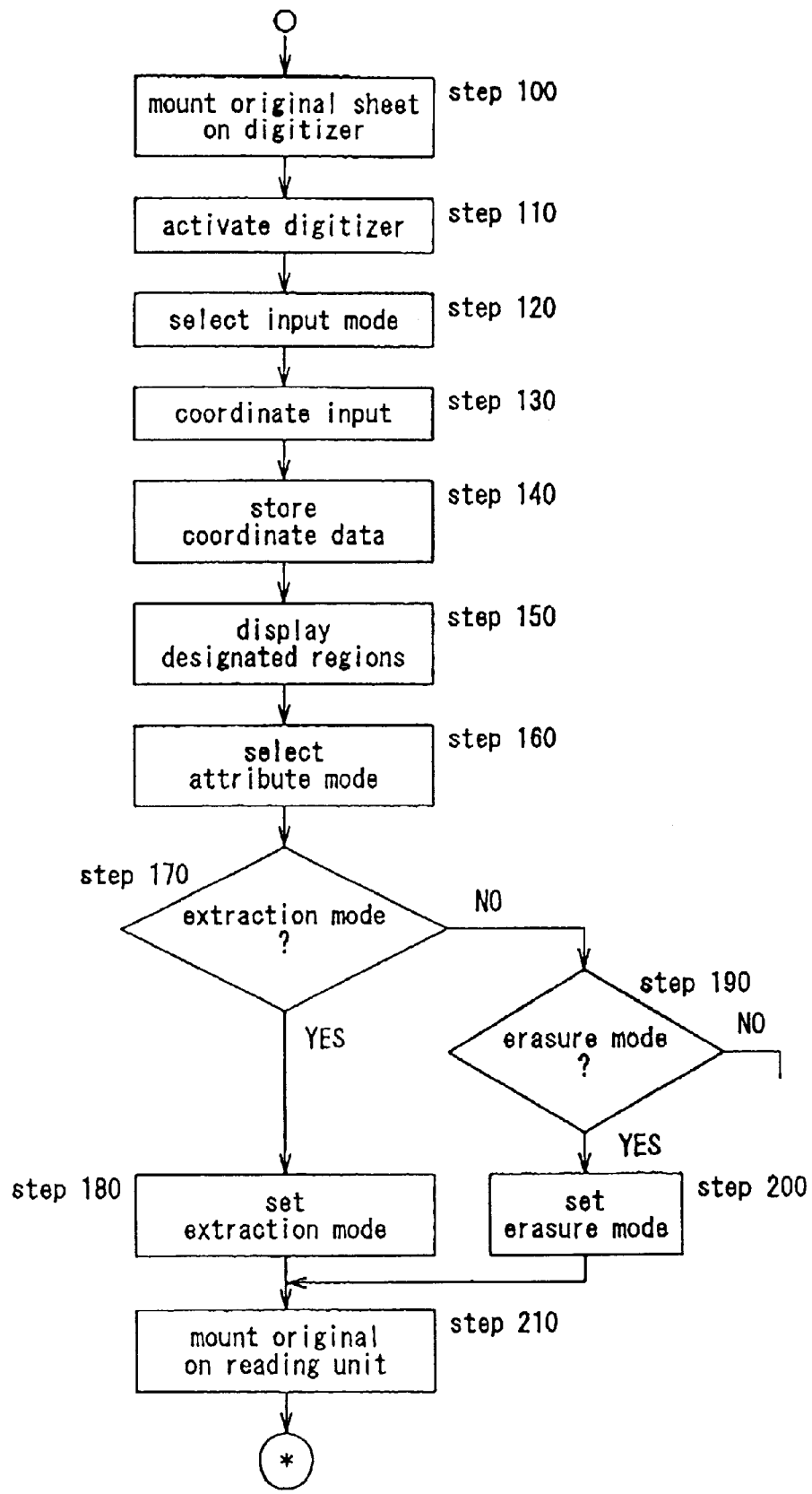
FIG. 6 is flow chart showing the first half of the operation of the stencil printing device equipped with the duplicate master plate making device according to the present invention.
Figure 7:
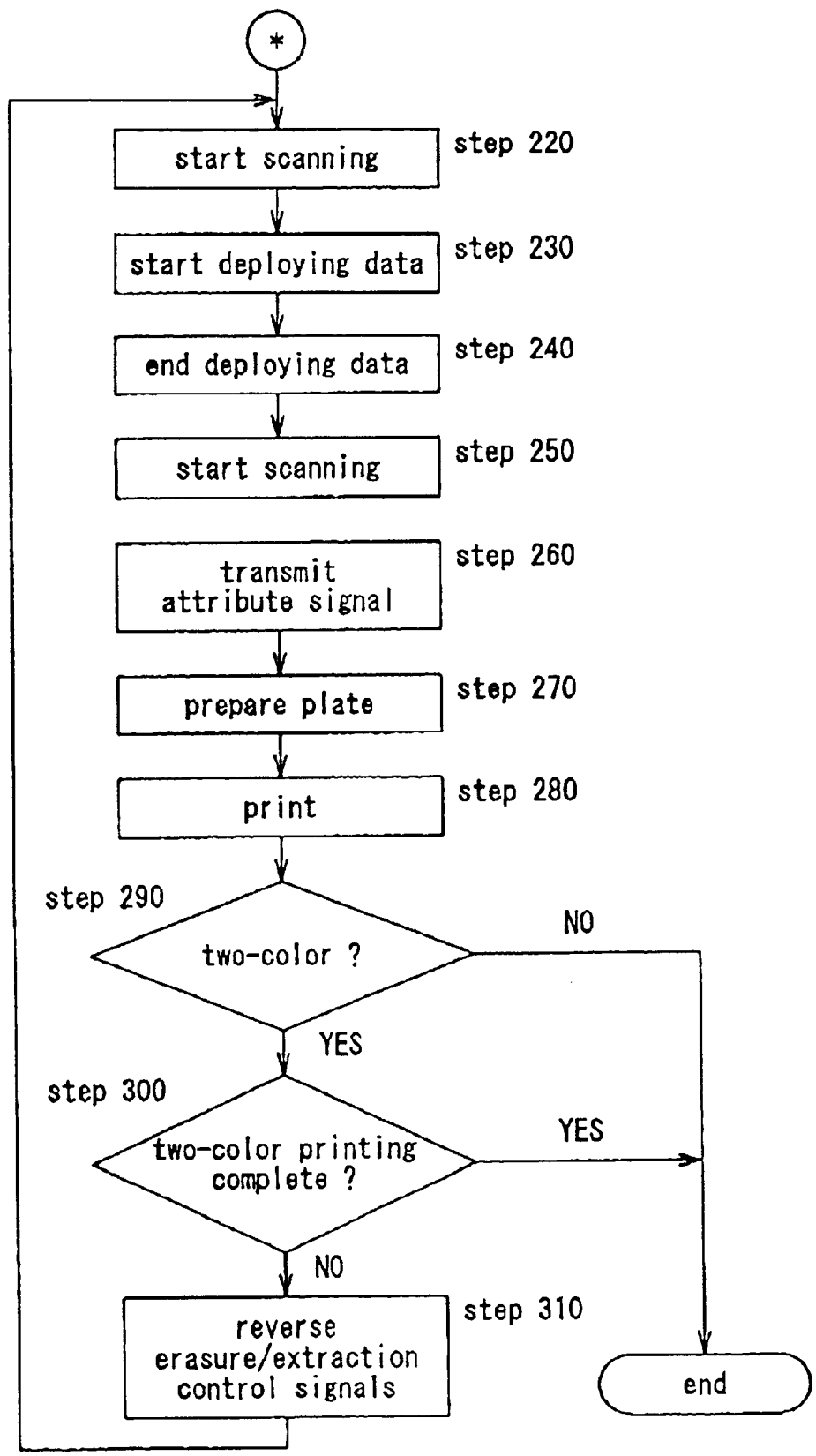
FIG. 7 is a flow chart showing the second half of the operation of the stencil printing device equipped with the duplicate master plate making device according to the present invention.

Now the operation of the device having the above described structure is described with reference to the flow chart given in FIGS. 6 and 7. The kinds of attributes that can be individually selected for each designated region, such as character, photography, reversal and halftone, are similar to those used conventionally, and are therefore not explained here.

At the beginning of the process for making a master plate, an original sheet d is mounted on the coordinate input surface unit 19 of the digitizer 5 with its side carrying an original image facing up (step 100). In the present embodiment, the upper left corner of the coordinate input surface unit 17 is given as a reference position.

Then, the digitizer 5 is turned on from the operation key unit 19 (step 110), and an input mode is selected (step 120). Possible input modes may include, for instance, two-point mode, multi-point mode and free curve mode. In this embodiment, the two-point mode is taken as an example.

Figure 8A:
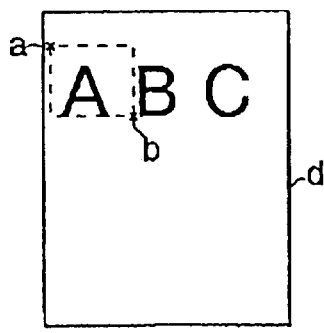
FIG. 8(A) shows an example of the original sheet.

When only the original image "A" is desired to be extracted from the original sheet d illustrated in FIG. 8(A), points a and b are pushed by the stylus pen 21 and the thus selected coordinates designate the region of the original image "A" (step 130).

The selected coordinate data is stored by the editing CPU 63 into the editing RAM 65 as rectangle coordinate data characterized by the points a and b defining a diagonal line (step 140).

With the coordinate reference point selected at the upper left corner, the y coordinate increases in value in the rightward direction, and the x coordinate increases in value in the downward direction.

Figure 8B:
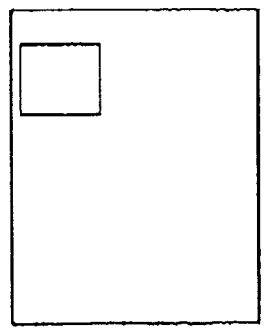
FIG. 8(B) shows an example of the display of a rectangular outline indicating a designated region.

The editing CPU 63 transfers the x and y coordinates of the point a and the x and y coordinates of the point b to the display CPU 67 in the order they are entered. According to the coordinate data of the points a and b, the display CPU 67 displays a rectangle representing the outline of the designated region on the display unit 23 as shown in FIG. 8(B) (step 150).

When the designation of a region or the entry of coordinates is completed, an attribute mode is selected with the operation key unit 19 of the digitizer 5 (step 160). When the extraction mode is selected with the operation key unit 19 of the digitizer 5, the extraction mode is set up (steps 170 and 180). When the erasure mode is selected, the erasure mode is set up (steps 190 and 200).

When the extraction mode is selected, the region other than the designated region is erased, and only the designated region in the original sheet d is used for the plate making process. When the erasure mode is selected, as opposed to the extraction mode, only the region other than the designated region is used for the plate making process.

Now, the original sheet d is removed from the coordinate input surface unit 17, and is then placed on the stage glass 7 of the original reading unit 3. The plate making start key on the panel unit 47 is pressed, a scan start signal is forwarded from the main control CPU 49 to the editing CPU 63 of the digitizer 5 (step 220).

Upon receiving the scan start signal, the editing CPU 63 starts writing data (attribute information signal) into all the area of the editing RAM 65 according to the entered coordinate data (region designating data) and attribute mode (step 230).

More specifically, once the scan start signal is received, the editing CPU 63 computes a rectangular area having its diagonal line defined by the entered points a and b. If the extraction mode is selected, a data value, for instance "00", is written into a RAM area as RAM data for the address area representing the interior of the rectangular area, and a data value "01" is written into the addresses outside this area to erase it.

If the erasure model is selected, the editing CPU 63 writes reversed data values to the corresponding areas as compared to the case of the extraction mode.

When this deployment of data is completed, a deployment complete signal is transmitted from the editing CPU 63 of the digitizer 5 to the main control CPU 49 (step 240).

Upon receiving the deployment complete signal, the main control CPU 49 activates the image sensor 9, and starts scanning and reading the original image on the original sheet placed on the stage glass 7 (step 250). At the same time as starting the reading of the original image, a secondary scanning reference signal, a primary scanning reference signal, and a reference clock signal are transmitted from the timing generator circuit 43, and are synchronized in such a manner that the coordinate values of the original image at the stage glass 7 correspond to the addresses of the editing RAM 65 on a one-to-one basis.

When the scanning and reading of the original image is started, the editing CPU 63, first of all, transfers one line of RAM data (attribute information signal) from the editing RAM 65 to the dual-port RAM 73 by using a non-image interval in each scan period (step 260). When the scanning point enters an effective image region, 8-bit RAM data is read out from the dual-port RAM 73 in synchronism with the reference clock from the timing generator circuit 43 as described previously. The lowermost bit D0 of this RAM data or the attribute information signal is reserved for erasure, and, therefore, is "1" outside the designated region (region to be erased) when the extraction mode is selected.

In this case, as far as the region outside the designated region is concerned, because the lowermost bit D0 of the RAM data is received as "0" signal by the AND circuit 111 via the invertor 113, without regard to the binary signal for forming an image received by the other input of the AND circuit 111, the output signal of the AND circuit 111 is always "0".

Then, the thermal head 13 is activated according to the output signal from the AND circuit 111, and the stencil master plate sheet s is processed (step 270).

In this plate making process, because the thermal head 13 does not perforate the stencil master plate sheet s when the output signal from the AND circuit 111 is "0", the area other than the designated region is processed as a non-perforated region when the extraction mode is selected.

The thus processed stencil master plate sheet s is mounted on the printing drum 15, and a stencil printing is carried out by using this stencil master plate sheet s (step 280).

Figure 8C:
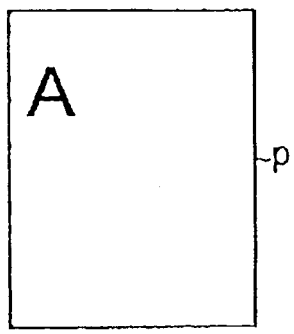
FIG. 8(C) shows an example of print made by the first master plate.

Because this stencil master plate sheet s is processed in such a manner that the region other than the designated region consists of a non-perforated region, the stencil printing using this stencil master plate sheet s will result in a printed material (printing paper p) in which the region other than the designated region is white (non-printed region), and only the region of "A" of the original sheet d is printed as illustrated in FIG. 8(C).

When the two-color printing mode is selected, and the two-color printing process is not completed (steps 290 and 300), following the process of preparing the first master plate, the lowermost bit D0 (erasure/extraction signal) of all the attribute information signal from each address of the editing RAM 65 is reversed between "0" and "1" for the preparation of the second stencil master plate (step 310).

Thus, the extracted region (effective region) for the first master plate is reversed into an erasure region, and the erasure region for the first master plate is reversed to an extraction region.

In the case of the two-color printing mode, upon completion of the stencil printing using the first master plate, the program flow returns to step 220, and steps 220 through 280 are repeated. Preparation of the second stencil master plate, and the stencil printing using the second master plate are thus executed, and the process of two-color printing is completed following the step of determining the completion of the two-color printing (step 300).

During the process of preparing the second master plate, because the lowermost bit D0 of all the signals from the editing RAM 65 is reversed between "0" and "1", only the region "A" of the original sheet d is processed as a non-perforated region for the second master plate.

Figure 8D:
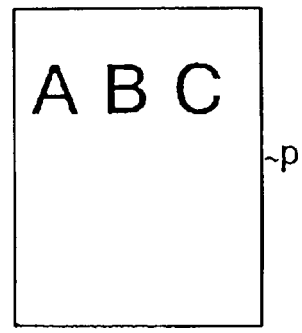
FIG. 8(D) is an example of a print made by printing the image of the second master plate on a print made by the first master plate.

Therefore, upon completion of the second stencil printing process in which the printing paper p having only the region "A" of the original sheet d printed by the first master plate is fed again, and a second master plate is mounted on another printing drum for printing ink of a different color, the region "BC" of the original sheet d is printed on the printing paper p on which the region "A" of the original sheet d is already printed, and the two-color printing is thus executed (see FIG. 8(D)).

The above described stencil printing device may further include the function of a multi-color printing mode in addition to the function of the two-color printing mode. In this case, the editing RAM 65 individually stores the coordinate data on the region designated by the stylus pen 21 on the coordinate input surface unit 17 for each stencil master plate. At the time of preparing each master plate, the editing RAM 65 reads out the corresponding data from the coordinate data stored in the editing RAM 65, and, using only the coordinate data corresponding to the stencil master plate currently being prepared as the effective data for this master plate, a signal having only the data associated with this effective region as the region for forming an image is forwarded to the dual-port RAM 73.

In other words, the coordinate data for each designated region is stored in the editing RAM 65 in association with master plate identification data corresponding to a specific master plate.

Figure 9:
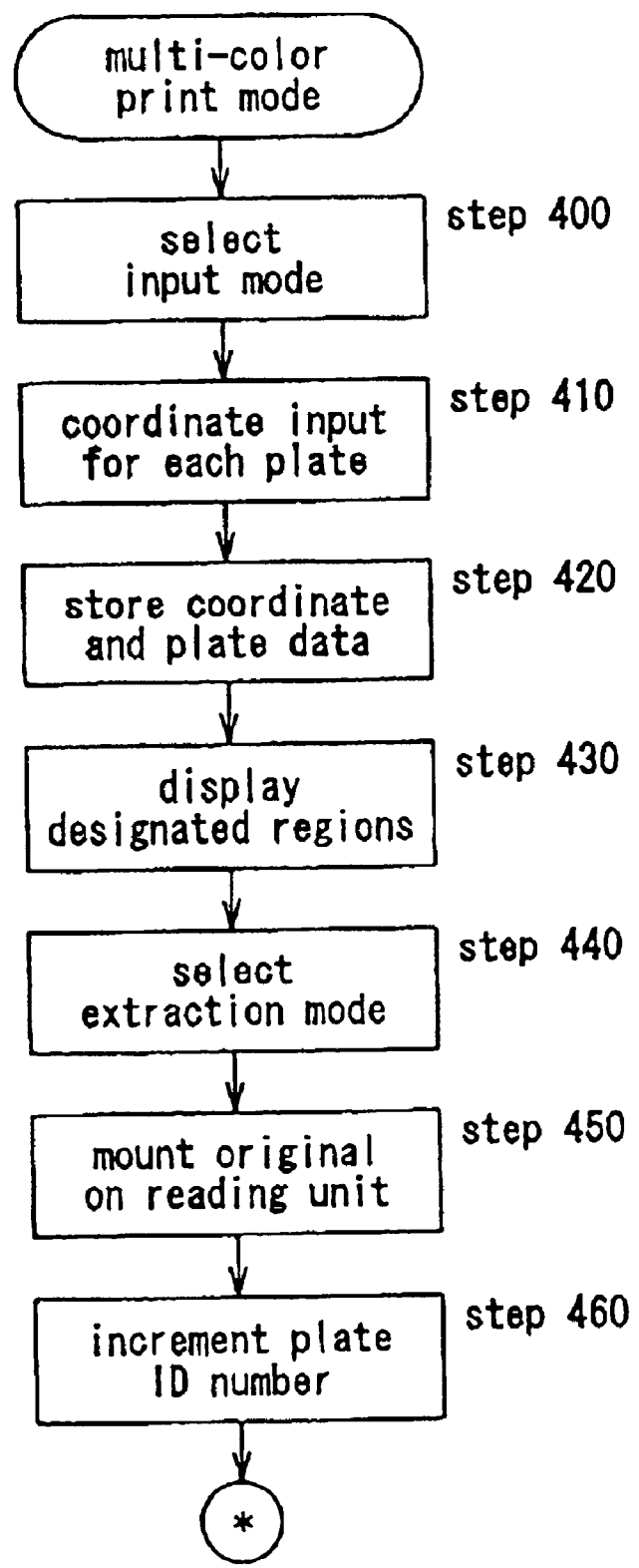
FIG. 9 is a flow chart showing the first half of the operation of the stencil printing device equipped with the duplicate master plate making device according to the present invention in the multi-color print mode.

Now the operation of the multi-color printing mode is described in the following with reference to the flow-chart of FIGS. 9 and 10.

First of all, the input mode is selected (step 400), and a region to be extracted is designated on the original image of the original sheet d mounted on the coordinate input surface unit 17 of the digitizer by pressing it with the stylus pen 21. The designation of a region to be extracted is carried out on the single original sheet d mounted on the coordinate input surface unit 17 for each master plate by inputting the master plate identification number data on the master plate (step 410).

The coordinate data designating a region to be extracted for each master plate is stored by the editing CPU 63 in the editing RAM 65 as rectangle coordinate data characterized by points a and b defining a diagonal line along with the data (n) identifying the current master plate (step 420).

The editing CPU 63 transfers the x and y coordinates of the point a and the x and y coordinates of the point b to the display CPU 67 in the order they are entered. The display CPU 67 displays a rectangle corresponding to the outline of the designated region on the display unit 23 along with a character indicating the current stencil master plate according to the coordinate data on the points a and b. (step 430).

When the designation of the regions to be extracted or the entering of coordinate data input is completed, the extraction mode is automatically selected (step 440).

The original sheet d is then removed from the coordinate input surface unit 17, and is placed on the stage glass 7 before the plate making start key of the panel unit 47 is pressed (step 450). This sets the indication number n of the current master plate to 1 (step 460), and a scan start signal is transmitted from the main body control CPU 49 to the editing CPU 63 of the digitizer 5 (step 470).

Upon reception of the scan start signal, the editing CPU 63 starts writing data (attribute information signal) into all the area of the editing RAM 65 according to the entered coordinate data (region designating data) and attribute mode (extraction mode in this case) for the current master plate identified by the entered digit n (step 480).

More specifically, once the scan start signal is received, the editing CPU 63 computes a rectangular area having its diagonal line defined by the two entered points, and a data value, for instance "00", is written into a RAM area as RAM data for the address area representing the interior of the rectangular area while a data value "01" is written into the addresses outside this area to erase it.

When this deployment of data is completed, a deployment complete signal is transmitted from the editing CPU 63 of the digitizer 5 to the main control CPU 49 (step 490).

Upon receiving the deployment complete signal, the main control CPU 49 activates the image sensor 9, and starts scanning and reading the original image on the original sheet placed on the stage glass 7 (step 500).

When the scanning and reading of the original image is started, the editing CPU 63, first of all, transfers one line of RAM data (attribute information signal) from the editing RAM 65 to the dual-port RAM 73 by using a non-image interval in each scan period (step 510). When the scanning point enters an effective image region, 8-bit RAM data is read out from the dual-port RAM 73 in synchronism with the reference clock from the timing generator circuit 43. The lowermost bit D0 of this RAM data or the attribute information signal is reserved for erasure, and, therefore, is "1" outside the designated region for the n-th master plate.

As far as the region outside the designated region is concerned, because the lowermost bit D0 of the RAM data is received as "0" signal by the AND circuit 111 via the invertor 113, without regard to the binary signal for forming an image received by the other input of the AND circuit 111, the output signal of the AND circuit 111 is always "0". Then, the thermal head 13 is activated according to the output signal from the AND circuit 111, and the stencil master plate sheet s is processed (step 520).

In this plate making process, because the thermal head 13 does not perforate the stencil master plate sheet s when the output signal from the AND circuit 111 is "0", the area other than the designated region for the n-th stencil master plate sheet is processed as a non-perforated region.

The thus processed stencil master plate sheet s is mounted on the printing drum 15, and a stencil printing is carried out by using this stencil master plate sheet s (step 530).

Because this stencil master plate sheet s is processed in such a manner that the region other than the designated region is left as a non-perforated region, the stencil printing using this stencil master plate sheet s will result in a printed material in which the region other than the designated region is white, and only the designated region is printed.

Until the process of multi-color printing is completed (step 540), the processing and printing with the second, third, . . . master plates are carried out one after the other by incrementing the master plate identification number data n of the stencil master plate (step 550), returning to step 470, and repeating the steps 470 to 530.

In step 480, the attribute information signal is written according to the coordinate data (region designating signal) and the attribute mode for the current (n-th) master plate, and, in the subsequent process of processing and printing with the second, third, . . . master plates, only the designated region for each current master plate is designated as an extracted region which is effective for forming an image while the region other than the designated region is defined as a region to be erased.

The stencil printing is carried out by extracting only the designated region for each of the thus processed stencil master plates, and the remaining region is left as a white area.

In this manner, the printing paper printed with the preceding stencil master plate is again fed into the printing device, and the printing drum is changed into the one for a different color each time so that a multi-color print having a same number of colors as the number of the master plates can be accomplished.

When there are N number of master plates, the designation of the effective regions by the operator is needed to be carried out only from the first master plate to the (N−1)-th master plate. The last master plate or the N-th master plate will have all the effective regions for the first to the (N−1)-th master plates as a region to be erased, and will have the remaining region as its effective region. This may be automatically effected by the editing CPU 63 in a similar fashion as the embodiment illustrated in the flow chart of FIG. 6. In this case, the coordinate data indicating the effective region for the N-th master plate can be written into the editing RAM 63, but may also be directly transferred from the editing CPU 63 to the dual-port RAM 73 on a real-time basis.

In the present invention, a region designated for a single original sheet is stored in storage means for each step of forming an image or for each step of preparing a master plate in a mutually distinguishable manner. The fact that the designated region for each step of forming an image or for each master plate is the effective region for each step of forming an image or for each step of preparing a master plate, as the case may be, means that the designation of the effective regions need to be carried out only to the first to the (N−1)-th master plate.

In the above description, the method and device of the present invention were described in terms of the process of making stencil master plates, but they are equally applicable to electrographic copying devices which form electrostatic latent images on a photosensitive drum, and form visible images by using toner of different colors.

As can be understood from the above description, according to the method and the device for forming a duplicate image, the designation of a number of regions for forming a duplicate image can be carried out without causing any conflict or errors simply by mounting the original sheet only once on a digitizer or the like. Thus, an accurate registration can be ensured in different master plates or other media for storing or latently forming individual regional images, and an image including a desired number of colors and other attributes can be conveniently and promptly formed.

Although the present invention has been described in terms of specific embodiments, it is possible to modify and alter details thereof without departing from the spirit of the present invention. For instance, although in the above described embodiment, the image data obtained by the image sensor 9 was processed and forwarded to the thermal head 13 on a real-time basis, it is also possible to store the image data in image storage means provided in a suitable part of the image processing unit 11 and placed under control from the main control CPU 49. By doing so, it becomes possible to edit the final image as desired without repeating the process of scanning and reading the original sheet.

What we claim is:

1. A method for forming a duplicate image by reading an original image from an original sheet, comprising the steps of:

designating a plurality of regions from a single original sheet by using region designating means;

storing data representing each of said designated regions in designated region storage means;

reading an overall original image from said single original sheet;

forming a regional image located inside each of said regions on image carrying means; and assigning attribute data to each of said designated regions, said attribute data representing said designated region as an effective region;

wherein N (N>2) number of different regions are designated in said step of designating regions, (N−1)-th region is actively designated, a remaining N-th region is designated by failing to be positively designated or being actively designated;

each of a plurality of said designated regions are stored in said designated region storage means along with identification number data for corresponding to the number of each of a plurality of said designated regions; and a regional image is selectively formed from said overall original image onto said image carrying means in accordance with said designated region data, said identification number data and said assigned attribute data.

2. A method for forming a duplicate image by reading an original image from an original sheet, comprising the steps of:

designating a plurality of regions from a single original sheet by using region designating means;

storing data representing each of said designated regions in designated region storage means;

reading an overall original image from said single original sheet;

forming a regional image located inside each of said regions on image carrying means; and assigning attribute data to each of said designated regions, said attribute data representing said designated region as an effective region;

wherein N (N=2) number of different regions are designated in said step of designating regions, (N−1)-th region is actively designated, a remaining N-th region is designated by failing to be positively designated; and a regional image is selectively formed from said overall original image onto said image carrying means in accordance with said designated region data and said assigned attribute data.

3. A method for forming a duplicate image according to claim 1 or 2, wherein said image carrying means consists of plain paper, and the regional image forming step comprises the steps of electrographically forming latent images of said regional images individually on a photosensitive drum, and depositing toner according to said latent images formed on said photosensitive drum on a single sheet of plain paper.

4. A method for forming a duplicate image according to claim 1 or 2, wherein said image carrying means consists of a stencil master plate sheet (s) for stencil printing.

5. A method for forming a duplicate image according to claim 1 or 2, wherein said image carrying means consists of printing paper, and the regional image forming step comprises the steps of forming regional images by perforation individually on a stencil mater plate sheet (s), and stencil printing said regional images on a single sheet of printing paper.

6. A device for forming a duplicate image by reading an original image from an original sheet, comprising:

region designating means for designating a plurality of regions from a single original sheet;

designated region storage means for storing data representing each of said designated regions;

image reading means for reading an overall original image from said single original sheet;

regional image forming means for forming a regional image located inside each of said regions on image carrying means; and attribute assigning means for assigning attribute data to each of said designated regions, said attribute data representing said designated region as an effective region;

wherein N (N>2) number of different regions are designated by said region designating means, (N−1)-th region is actively designated, a remaining N-th region is designated by failing to be positively designated or is actively designated;

each of a plurality of said designated regions are stored in said designated region storage means along with identification number data for corresponding to the number of each of a plurality of said designated regions; and a regional image is selectively formed from said overall original image onto said image carrying means in accordance with said designated region data, said identification number data and said assigned attribute data.

7. A device for forming a duplicate image by reading an original image from an original sheet, comprising:

region designating means for designating a plurality of regions from a single original sheet;

designated region storage means for storing data representing each of said designated regions;

image reading means for reading an overall original image from said single original sheet;

regional image forming means for forming a regional image located inside each of said regions on image carrying means; and attribute assigning means for assigning attribute data to each of said designated regions, said attribute data representing said designated region as an effective region;

wherein N (N=2) number of different regions are designated by said region designating means, (N−1)-th region is actively designated, and a remaining N-th region is designated by failing to be positively designated; and a regional image is selectively formed from said overall original image onto said image carrying means in accordance with said designated region data and said assigned attribute data.

8. A device for forming duplicate image according to claim 6 or 7, wherein said region designating means comprises coordinate input means for inputting coordinates.

9. A device for forming duplicate image according to claim 6 or 7, wherein said image carrying means consists of plain paper, and the regional image forming means comprises means for electrographically forming latent images of said regional images individually on a photosensitive drum, and means for depositing toner according to said latent images formed on said photosensitive drum on a single sheet of plain paper.

10. A device for forming a duplicate image according to claim 6 or 7, wherein said image carrying means consists of a stencil master plate sheet (s) for stencil printing.

11. A device for forming duplicate image according to claim 6 or 7, wherein said image carrying means consists of printing paper, and the regional image forming step comprises means for forming regional images by perforation individually on a stencil master plate sheet (s), and stencil printing means for printing said regional images on a single sheet of printing paper.

* * * * *